(12) United States Patent
Sugitani et al.

(10) Patent No.: US 10,834,309 B2
(45) Date of Patent: Nov. 10, 2020

(54) LENS CONTROL APPARATUS AND CONTROL METHOD FOR TRACKING MOVING OBJECT

(71) Applicant: CANON KABUSHIKI KAISHA, Tokyo (JP)

(72) Inventors: Kuniaki Sugitani, Kawasaki (JP); Yasuyuki Suzuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/186,959

(22) Filed: Nov. 12, 2018

(65) Prior Publication Data

US 2019/0149741 A1  May 16, 2019

(30) Foreign Application Priority Data

Nov. 16, 2017 (JP) .................. 2017-221285
Nov. 2, 2018  (JP) .................. 2018-207518

(51) Int. Cl.
*H04N 5/232* (2006.01)
*G02B 7/36* (2006.01)

(52) U.S. Cl.
CPC ......... *H04N 5/232121* (2018.08); *G02B 7/36* (2013.01); *H04N 5/232* (2013.01); *H04N 5/23212* (2013.01)

(58) Field of Classification Search
CPC ......... H04N 5/232121; H04N 5/23212; H04N 5/232; G02B 7/36
See application file for complete search history.

(56) References Cited

U.S. PATENT DOCUMENTS 5,448,329 A * 9/1995 Nakata ..................... G02B 7/36
                                                 396/104
5,587,762 A * 12/1996 Watanabe ................. G02B 7/28
                                                 396/95
(Continued)

FOREIGN PATENT DOCUMENTS

CN    103430554 A    12/2013
CN    104641277 A    5/2015
(Continued)

OTHER PUBLICATIONS

T. J. Broida and R. Chellappa, "Estimation of Object Motion Parameters from Noisy Images," in IEEE Transactions on Pattern Analysis and Machine Intelligence, vol. PAMI-8, No. 1, pp. 90-99, Jan. 1986 (Year: 1986).*

*Primary Examiner* — Shahbaz Nazrul
(74) *Attorney, Agent, or Firm* — Canon U.S.A., Inc. IP Division

(57) ABSTRACT

Based on information corresponding to a state of an object at a first time, information corresponding to the state of the object at a second time after the first time is estimated. The information corresponding to the state of the object at the second time is calculated by correcting the estimated information corresponding to the state of the object at the second time based on a focus detection result detected by a focus detection unit at the second time. Based on the information corresponding to the state of the object at the second time and information of time from the second time to a third time after the second time, an image plane position at the third time is predicted. Based on the image plane position predicted by a first prediction unit, driving of a focus lens is controlled.

11 Claims, 8 Drawing Sheets

(56) References Cited

U.S. PATENT DOCUMENTS

| | | | | |
|---|---|---|---|---|
| 5,625,434 | A * | 4/1997 | Iwane | G02B 7/36 |
| | | | | 396/95 |
| 5,787,314 | A * | 7/1998 | Iwane | G02B 7/28 |
| | | | | 396/95 |
| 5,862,417 | A * | 1/1999 | Ogasawara | G02B 7/28 |
| | | | | 396/95 |
| 5,873,006 | A * | 2/1999 | Iwane | G02B 7/28 |
| | | | | 396/95 |
| 8,135,269 | B2 * | 3/2012 | Noto | G02B 7/102 |
| | | | | 396/91 |
| 2008/0031611 | A1 * | 2/2008 | Konishi | G03B 13/32 |
| | | | | 396/102 |
| 2012/0237193 | A1 * | 9/2012 | Kawarada | G02B 7/34 |
| | | | | 396/95 |
| 2017/0054896 | A1 * | 2/2017 | Sugitani | H04N 5/23212 |
| 2017/0094151 | A1 * | 3/2017 | Akaguma | H04N 5/23254 |

FOREIGN PATENT DOCUMENTS

| | | |
|---|---|---|
| CN | 106982313 A | 7/2017 |
| JP | 2001-21794 A | 1/2001 |

\* cited by examiner

LENS CONTROL APPARATUS AND CONTROL METHOD FOR TRACKING MOVING OBJECT

BACKGROUND OF THE INVENTION

Field of the Invention

One disclosed aspect of the embodiments relates to a lens control technique.

Description of the Related Art

Conventionally, a technique for, based on a focus detection result at a certain time, predicting an image plane position at a time after the certain time and controlling the driving of a focus lens based on the predicted image plane position is discussed.

The publication of Japanese Patent Application Laid-Open No. 2001-21794 discusses a known technique for obtaining a coefficient that is the fittest for a prediction function by a least squares method (also referred to as a "batch least squares method"), using a plurality of pieces of data of image plane positions and a plurality of pieces of data of focus detection times corresponding to the image plane positions, thereby predicting an image plane position.

An image plane position is predicted using the above batch least squares method, and the driving of a focus lens is controlled based on the predicted image plane position, whereby it is possible to adjust a focal position to a moving object.

However, to obtain a more stable prediction result in a case where the image plane position corresponding to the object at a time after a certain time is predicted using the batch least squares method, it is necessary to increase the amount of calculation. This is because it is necessary to perform calculations using more pieces of data of image plane positions and focus detection times corresponding to the image plane positions.

SUMMARY OF THE INVENTION

One disclosed aspect of the embodiments is directed to a lens control apparatus capable of reducing processing load and also appropriately focusing on an object, and a method for controlling the lens control apparatus.

According to an aspect of the embodiments, a lens control apparatus includes an estimation unit, a state calculation unit, a first prediction unit, and a driving control unit. The estimation unit is configured to, based on information corresponding to a state of an object at a first time, estimate information corresponding to the state of the object at a second time after the first time. The state calculation unit is configured to calculate the information corresponding to the state of the object at the second time, by correcting the information corresponding to the state of the object at the second time estimated by the estimation unit based on a focus detection result detected by a focus detection unit at the second time. The first prediction unit is configured to predict an image plane position at a third time after the second time based on the information corresponding to the state of the object at the second time calculated by the state calculation unit and information about a time from the second time to the third time. The driving control unit is configured to control driving of a focus lens based on the image plane position predicted by the first prediction unit.

According to another aspect of the embodiments, a lens control apparatus includes a defocus amount detection unit, a calculation unit, a storage unit, an identification unit, a first prediction unit, and a determination unit. The defocus amount detection unit is configured to detect a defocus amount being a difference between an image formation position of an imaging lens and an image plane position of the imaging lens where the imaging lens performs an image capturing operation. The calculation unit is configured to calculate an image plane position corresponding to an object from the defocus amount detected by the defocus amount detection unit and the image formation position of the imaging lens. The storage unit is configured to store a plurality of detection times when the defocus amount detection unit detects the defocus amount and a plurality of previous image plane positions of the object calculated by the calculation unit. The identification unit is configured to, using a model of a previous image plane position corresponding to the object and the image plane position corresponding to the object calculated by the calculation unit, identify a model of the image plane position corresponding to the object by a recursive identification method. The first prediction unit is configured to, using the model of the image plane position corresponding to the object identified by the identification unit, predict a future image plane position corresponding to the object. The determination unit is configured to, in a case where an identification degree of the model of the image plane position corresponding to the object identified by the identification unit is less than a first threshold, determine that the future image plane position corresponding to the object predicted by the first prediction unit is to be used.

Further features of the disclosure will become apparent from the following description of exemplary embodiments with reference to the attached drawings.

DESCRIPTION OF THE EMBODIMENTS

A description is given of a first exemplary embodiment. In the present exemplary embodiment, an example is described where the disclosure is applied to a digital single-lens reflex camera.

<Configuration of Imaging Apparatus>

Figure 1:
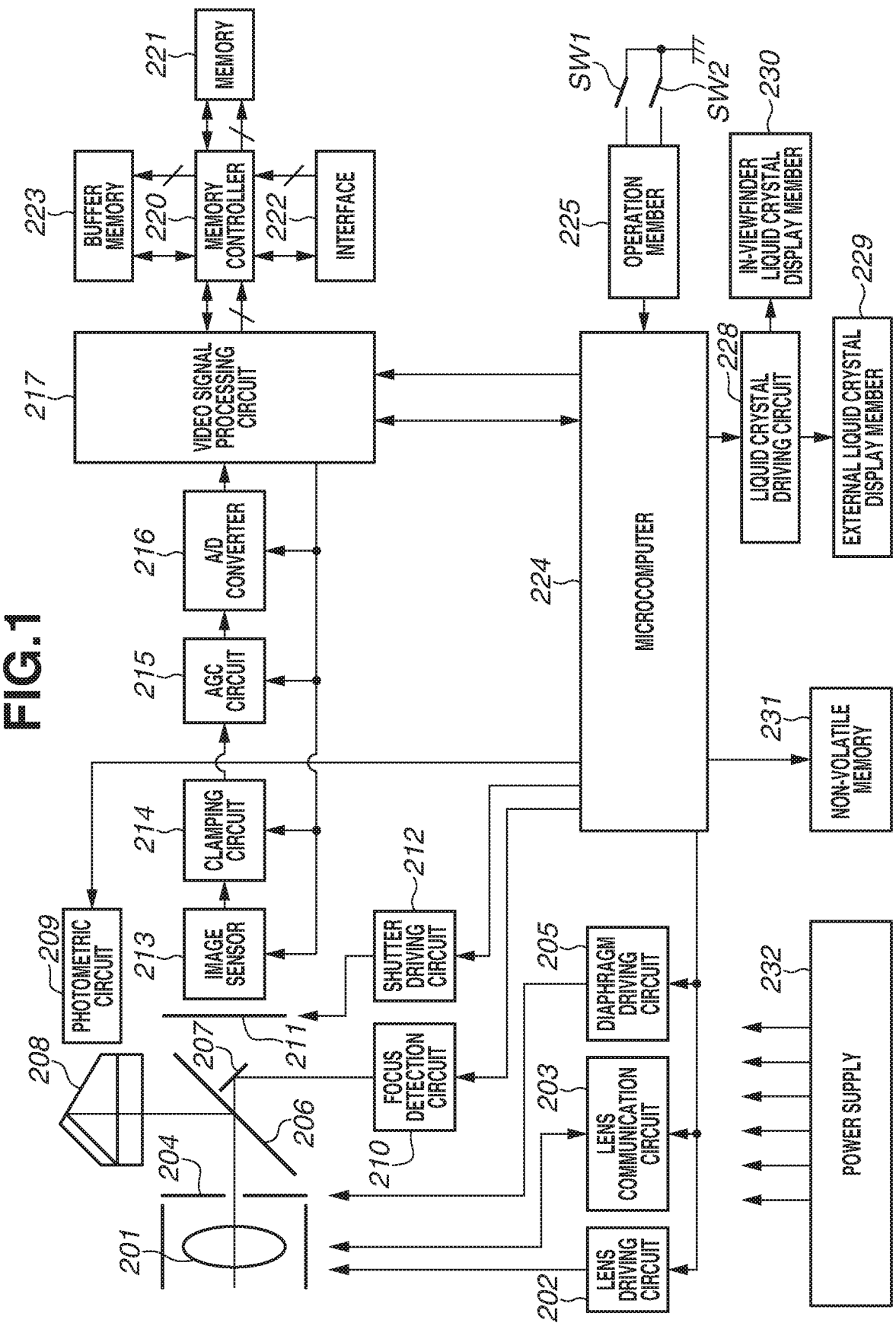
FIG. 1 is a block diagram illustrating a configuration of a digital single-lens reflex camera according to a first exemplary embodiment.

FIG. 1 is a block diagram illustrating the configuration of the digital single-lens reflex camera.

A lens driving circuit 202 includes, for example, a direct current (DC) motor or a stepping motor. A microcomputer 224 controls driving so that the lens driving circuit 202 changes the position of a focus lens included in an imaging lens 201, thereby adjusting a focal position. In other words, the microcomputer 224 controls the lens.

A lens communication circuit 203 communicates with a microcomputer (not illustrated) within the imaging lens 201. The content of the communication is controlled by the microcomputer 224, so that the lens communication circuit 203 acquires the state of the imaging lens 201.

A diaphragm driving circuit 205 drives a diaphragm 204. The amount by which the diaphragm 204 should be driven is calculated by the microcomputer 224, and an optical diaphragm value is changed.

A main mirror 206 is usually disposed to reflect a light beam to guide the light beam to a viewfinder portion (not illustrated). However, in a case where an image is captured, the main mirror 206 flips up and retracts from a light beam to guide the light beam to an image sensor 213. In other words, the main mirror 206 switches between guiding a light beam incident from the imaging lens 201 to the viewfinder side and guiding the light beam incident from the imaging lens 201 to the image sensor side. The main mirror 206 is a half mirror so that a center portion of the main mirror 206 can transmit a part of light. The main mirror 206 transmits a part of a light beam so that the part of the light beam is incident on a focus detection sensor (placed in a focus detection circuit 210) for performing focus detection.

A sub-mirror 207 reflects the light beam transmitted through the main mirror 206 and guides the light beam to the focus detection sensor for performing focus detection.

A pentaprism 208 guides the light beam reflected by the main mirror 206 to the viewfinder portion (not illustrated). The viewfinder portion includes a focusing screen and an eyepiece lens (not illustrated).

A photometric circuit 209 converts the color and the brightness of an object image formed on the focusing screen (not illustrated) into an electric signal, using a photometric sensor (placed in the photometric circuit 209) including a color filter.

The light beam transmitted through the center portion of the mirror 206 and reflected by the sub-mirror 207 reaches the focus detection sensor for performing photoelectric conversion placed within the focus detection circuit 210. The amount of defocus, which is the result of focus detection, is found by calculating the output of the focus detection sensor. The microcomputer 224 evaluates the calculation result and instructs the lens driving circuit 202 to drive the focus lens.

A shutter driving circuit 212 drives a focal-plane shutter 211. The opening time of the shutter is controlled by the microcomputer 224.

A charge-coupled device (CCD) or a complementary metal-oxide-semiconductor (CMOS) sensor is used as the image sensor 213. The image sensor 213 converts an object image formed by the imaging lens 201 into an electric signal.

A clamping circuit 214 and an automatic gain control (AGC) circuit 215 perform basic analog signal processing before analog-to-digital (A/D) conversion is performed. Then, the microcomputer 224 changes a clamp level and an AGC reference level.

An A/D converter 216 converts an analog output signal from the image sensor 213 into a digital signal.

A video signal processing circuit 217 is achieved by a logic device such as a gate array. The video signal processing circuit 217 performs a filter process, a color conversion process, and a gamma process on digitalized image data, also performs a Joint Photographic Experts Group (JPEG) compression process on the digitalized image data, and outputs the resulting image data to a memory controller 220.

The video signal processing circuit 217 can output exposure information and information about white balance of the signal from the image sensor 213 to the microcomputer 224, as necessary. Based on these pieces of information, the microcomputer 224 gives an instruction to adjust the white balance or the gain. In the case of a continuous image capturing operation, images are continuously captured by temporarily storing captured data as unprocessed images as they are in a buffer memory 223, reading the unprocessed image data through the memory controller 220, and performing image processing and a compression process on the read image data using the video signal processing circuit 217. The number of continuously captured images depends on the size of the buffer memory 223.

The memory controller 220 stores unprocessed digital image data input from the video signal processing circuit 217 in the buffer memory 223 and stores processed digital image data in a memory 221. On the other hand, the memory controller 220 outputs image data from the buffer memory 223 or the memory 221 to the video signal processing circuit unit 217. There is also a case where the memory 221 is removable. The memory controller 220 can output an image stored in the memory 221 via an external interface 222, which can connect to a computer.

An operation member 225 notifies the microcomputer 224 of the state of the operation member 225. According to a change in the state of the operation member 225, the microcomputer 224 controls components.

A switch 1 (hereinafter "SW1") and a switch 2 (hereinafter "SW2") are switches that are turned on and off by operating a shutter release button. Each of the SW1 and the SW2 is one of input switches of the operation member 225. A state where only the SW1 is on is a half-press state of the shutter release button. In this state, an autofocus operation or a photometric operation is performed.

A state where both the SW1 and the SW2 are on is a full-press state of the shutter release button and is an on state of the shutter release button for recording an image. In this state, an image is captured. While the SW1 and the SW2 continue to be on, a continuous image capturing operation is performed. Additionally, the operation member 225 is connected to switches such as an International Organization for Standardization (ISO) setting button, an image size setting button, an image quality setting button, and an information display button (not illustrated), and the states of the switches are detected.

According to a display content command from the microcomputer 224, a liquid crystal driving circuit 228 drives an external liquid crystal display member 229 or an in-viewfinder liquid crystal display member 230. In the in-viewfinder liquid crystal display member 230, a backlight with light-emitting diodes (LEDs) (not illustrated) is placed, and the LEDs are also driven by the liquid crystal driving circuit 228. Based on predicted value data of the image size according to the ISO sensitivity, the image size, and the image quality set before an image is captured, the microcomputer 224 can confirm the capacity of the memory 221 through the memory controller 220 and then calculate the number of images that can still be captured. The number can also be displayed on the external liquid crystal display member 229 or the in-viewfinder liquid crystal display member 230, as necessary.

A non-volatile memory 231 (an Electrically Erasable Programmable Read-Only Memory (EEPROM)) can save data even in the state where the camera is off. For example, a plurality of pieces of information about image plane positions corresponding to the amounts of defocus detected at different times are stored together with a plurality of pieces of information about times corresponding to the image plane positions. The configuration may be such that the plurality of pieces of information about the image plane positions and the plurality of pieces of information about the times corresponding to the image plane positions are stored in a volatile memory (not illustrated), and the data is erased if the camera is turned off.

A power supply unit 232 supplies necessary power to each integrated circuit (IC) and a driving system.

The microcomputer 224 according to the present exemplary embodiment is an example of a state calculation unit, a distance calculation unit, an error calculation unit, a speed calculation unit, a defocus amount detection unit, and a determination unit in the claims of the present application.

<Kalman Filter Calculations>

Kalman filter calculations used in the present exemplary embodiment are described. First, general Kalman filter calculations are described. Time series data y(k) at a time k is given by the following equations. The time series data is also referred to as an observation value. In the description below, all of a time k−1, the time k, and a time k+1 are equivalent to a time at which the time series data is obtained.

$$y(k) = X^T(k)A(k) + \omega(k) \quad (1)$$

$$A(k+1) = L(k)A(k) + m(k)v(k) \quad (2)$$

X(k) and m(k) are n-dimensional column vectors. A(k) is an n-dimensional column vector (a state vector). ω(k) is observation noise having an average value of 0 and a variance $\sigma_\omega^2$. L(k) is an n-by-n matrix. v is system noise having an average value of 0 and a variance $\sigma_v^2$.

The Kalman filter calculations are performed to find the state vector A(k) and are divided into two calculation steps, namely a prediction step and a filtering step. First, in the prediction step, a state is estimated in advance. Then, in the filtering step, a state is estimated using an observation result.

In the prediction step, an advance state estimation vector A'(k) (an n-dimensional column vector) and an advance error covariance matrix P'(k) (an n-by-n matrix) are found by the following equations. In the description below, all of a time k−1, the time k, and a time k+1 are equivalent to a time at which the time series data y(k) is obtained.

$$A'(k) = L(k-1)A(k-1) \quad (3)$$

$$P'(k) = L(k-1)P(k-1)L^T(k-1) + \delta_v^2(k-1)m(k-1)m^T(k-1) \quad (4)$$

As illustrated in the above equations, the advance state estimation vector A'(k) is used to estimate the state vector at the time k based on a state vector (k−1) obtained at a time k−1 and any L(k). The advance error covariance matrix P'(k) in equation (4) is an estimated error between the state vector A(k) and the advance state estimation vector A'(k) at the time k.

In the filtering step, based on the detected time series data y(k), the state estimation vector A(k) (an n-dimensional column vector) is found by the following equation (5). An ex-post error covariance matrix P(k) (an n-by-n matrix) is found by the following equation (6):

$$A(k) = A'(k) + g(k)(y(k) - X^T(k)A'(k)) \quad (5)$$

$$P(k) = (I - g(k)X^T(k))P'(k) \quad (6)$$

As illustrated in the above equations, A(k) is calculated by adding, to A'(k), a correction value obtained by multiplying the difference between y(k), which is an actual detection result, and $X^T(K)A'(K)$, which is based on a detection result predicted in advance, by a Kalman gain g(k). A matrix I is an n-by-n identity matrix.

The Kalman gain g(k) is obtained by the following equation (7).

$$g(k) = \frac{P'(k)X(k)}{\sigma_\omega^2(k) + X^T(k)P'(k)X(k)} \quad (7)$$

As illustrated in the above equation (7), the greater the observation noise $\sigma_\omega^2(k)$, the smaller the Kalman gain g(k). The larger the advance error covariance matrix P'(k), the smaller the Kalman gain g(k). In other words, in a case where it is considered highly likely that an error is occurring in detected y(k) or $X^T(K)A'(K)$, g(k) is smaller than in a case where an error is not occurring in y(k) or $X^T(K)A'(K)$. Consequently, A(k) to be calculated is less likely to be influenced by an error.

An initial value A(0) of the state vector and an initial value P(0) of the error covariance matrix are given by the following equations.

$$A(0) = \begin{bmatrix} a_0(0) \\ a_1(0) \\ \ldots \\ a_{n-1}(0) \end{bmatrix} \quad (8)$$

$$P(0) = p_0 I \quad (9)$$

<Kalman Filter Calculations and model formula in Present Exemplary Embodiment>

The Kalman filter calculations in the present exemplary embodiment are described.

If the above Kalman filter calculations are applied to the present exemplary embodiment, y(k) is the detection result of an image plane position at the time k. In the Kalman filter calculations according to the present exemplary embodiment, the image plane position and an image plane moving speed at the time k are estimated from the state vector A(k) as information corresponding to a state of an object. Also, the image plane position and the image plane moving speed at the time k+1 are estimated as the information corresponding to the state of the object by calculating the state vector A(k+1) based on the state vector A(k). In the present exemplary embodiment, the image plane position is the position of the rear focus corresponding to the imaging lens 201 (also referred to as "the image plane position of the imaging lens" or "the lens image plane position"). The image plane position corresponding to an object (where lens must be focused) is the position of the rear focus in a case where the imaging lens 201 is at the position where the object is in front focus. In other words, the image plane position corresponding to the object is, at the time when focus detection is performed on the object, the position of the rear focus calculated based on the result of the focus detection (the defocus amount in the present exemplary embodiment) and the rear focus at that time. Although, in the present exemplary embodiment, using an image plane position as information corresponding to the image plane position is described as an example, information other than the information corresponding to the image plane position can be used. For example, since the image plane position corresponds to the position of the imaging lens 201, the position of the imaging lens 201 corresponding to the image plane position can be used instead of the image plane position in the present exemplary embodiment. In this case, the image plane position corresponding to the object is, at the time when focus detection is performed on the object, the position of the focus lens calculated based on the result of the focus detection (the defocus amount in the present exemplary embodiment) and the focus lens position at that time.

Figure 7:
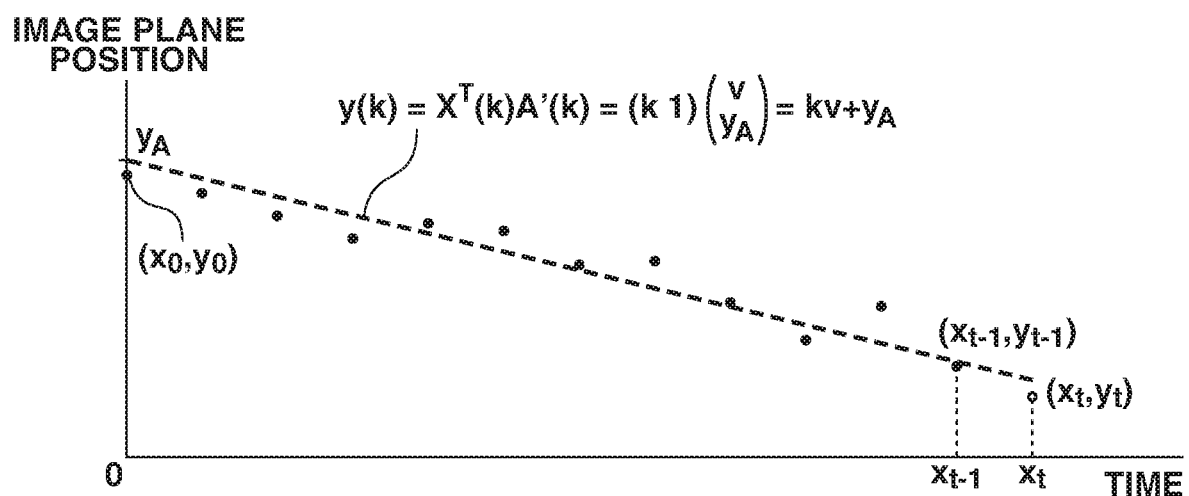
FIG. 7 is a diagram illustrating Kalman filter calculations according to the first exemplary embodiment.

A model formula for predicting the motion of the object is described, using the information corresponding to the state of the object (the image plane position and the image plane moving speed estimated by the Kalman filter calculations). FIG. 7 illustrates an example of the model formula or equation. A model formula or equation for predicting the image plane position corresponding to the object in one dimension (in two dimensions) as indicated by a dashed line in FIG. 7 is considered. In this model, the image plane position at the time k can be predicted based on an average image plane moving speed v at the time k and an image plane position $y_A$ at a time 0. At this time, a column vector A is defined as the image plane position (intercept) $y_A$ at the time 0 and the average image plane moving speed (slope) v at the time k. A column vector X is defined as 1 so that at the time k and the image plane position $y_A$ are constants. The variance $\sigma_\omega^2$ may be placed based on the variance of detection results. In the initial value A(0), the initial value of $y_A$ may be placed based on, for example, an image plane position yo detected for the first time. The initial value of the average image plane moving speed v may be placed as 0. In the initial value P(0), an appropriate value may be placed. A matrix L, a column vector m, and the variance $\sigma_v^2$ may be set based on the properties of the model, i.e., the properties such as the motion of the object to be captured, or may be time-invariant.

An image plane moving speed is the speed at which the image plane position moves and which corresponds to the moving speed of the object.

In the present exemplary embodiment, for merely illustrative purposes, an example has been described where the model formula or equation is one-dimensional (two-dimensional). The model formula or equation, however, may use any dimensions according to the motion of the object to be assumed, and the column vector A may only need to be defined according to the dimensions of the model formula or equation.

Based on the above, matrices, vectors, and variances necessary in the prediction step are defined. Then, the filtering step using the detection results of the image plane position and the prediction step for the next time are repeated, whereby it is possible to obtain the model formula or equation for predicting the motion of the object by the Kalman filter calculations.

According to the Kalman filter calculations, as described above, calculations are performed taking an error into account. For this reason, even in a situation where an error is likely to occur in focus detection results, it is possible to predict the image plane position with high accuracy.

<Calculations by Batch Least Squares Method>

Figure 8:
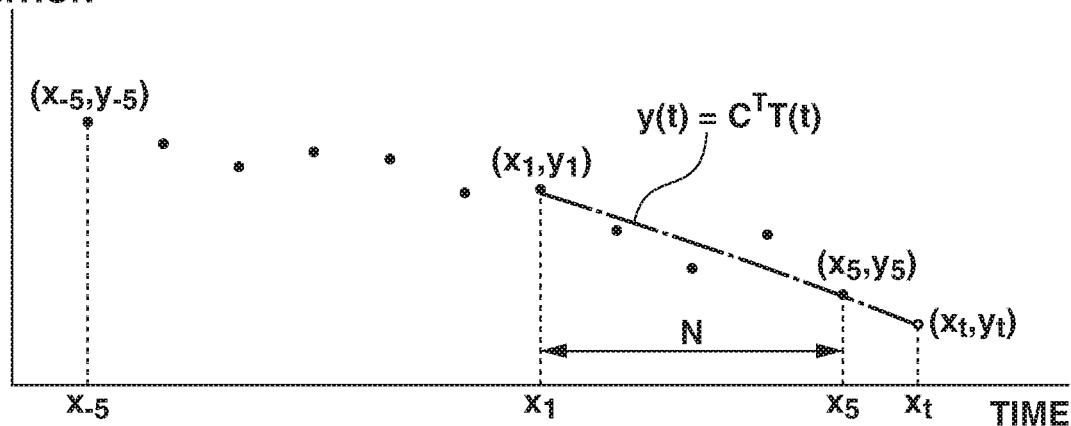
FIG. 8 is a diagram illustrating a batch least squares method.

With reference to FIG. 8, the prediction of the image plane position based on a batch least squares method, which is also discussed in the publication of Japanese Patent Application Laid-Open No. 2001-21794, is described in more detail.

The image plane position at a time $x_k$ is $y_k$ and is represented as "●" in FIG. 8. When a plurality of marks "●" in FIG. 8 is represented by an (n−1)-th order multidimensional formula model at a time t, the image plane position y(t) is given by the following equation, where the image plane position is y(t), a time parameter is a column vector T(t), and the coefficient of the model formula or equation is a column vector C(t), and a dashed-dotted curve in FIG. 8 is given.

$$y(t) = C(t)^T T(t) \tag{10}$$

The column vector C(t) and the column vector T(t) are as follows:

$$C(t) = \begin{bmatrix} c_0 \\ c_1 \\ \cdots \\ c_{n-1} \end{bmatrix} \tag{11}$$

$$T(t) = \begin{bmatrix} t^0 \\ t^1 \\ \cdots \\ t^{n-1} \end{bmatrix} \tag{12}$$

As a method for finding the above column vector C, the batch least squares method can be used. The model formula or equation is an (n−1)-th order multidimensional formula. The number of measurement results of previous image plane positions is N. A matrix Z(k) is given by the times when focus detection results corresponding to the previous image plane positions including the time k are obtained. A column vector Y(k) is given by the previous image plane positions including the time k. At this time, a column vector C(k) to be found is given by the following equation.

$$C(k) = [Z(k)^T Z(k)]^{-1} Z(k)^T Y(k) \tag{13}$$

The matrix Z(k) and the column vector Y(k) are given by the following formulas.

$$Z(k) = \begin{bmatrix} z_{k-N+1}^0 & z_{k-N+1}^1 & \cdots & z_{k-N+1}^{n-1} \\ z_{k-N+2}^0 & z_{k-N+2}^1 & \cdots & z_{k-N+2}^{n-1} \\ \cdots & \cdots & \cdots & \cdots \\ z_k^0 & z_{k-N}^1 & \cdots & z_k^{n-1} \end{bmatrix} \tag{14}$$

$$Y(k) = \begin{bmatrix} y_{k-N+1} \\ y_{k-N+2} \\ \cdots \\ y_k \end{bmatrix} \tag{15}$$

The image plane position is predicted using the above batch least squares method, and the driving of the focus lens is controlled based on the predicted image plane position, whereby it is possible to adjust the focal position to the moving object.

However, in a case where the image plane position corresponding to the object at a time after a certain time is predicted using the batch least squares method, it is necessary to increase the amount of calculation in order to obtain a more stable prediction result. The amount of calculation for finding the column vector C is at least $O(N \cdot n^2)$. For this reason, it is necessary to use a large number of previous measurement results N in order to find a stable column vector C. The amount of calculation increases in proportion to N.

In contrast, the amount of calculation of the Kalman filter using n-dimensional parameters is $O(n^3)$. When the model formula or equation is low-dimensional, it is possible to make the number of calculation times of the Kalman filter sufficiently smaller than that of the batch least squares method in the same dimensions. When the observation results vary, the batch least squares method is inclined to take a great number of previous observation results N to be used for calculations. As described above, however, the amount of calculation of the batch least squares method is $O(Nn^2)$. For this reason, if N is a great number, the amount of calculation of the batch least squares method is far greater than the amount of calculation of the Kalman filter. Accordingly, as in the present exemplary embodiment, calculations are performed by the Kalman filter in an appropriate scene, whereby it is possible to make the amount of calculation smaller than the amount of calculation of the batch least squares method.

<Example of Operation of Image Capturing Process>

Figure 2:
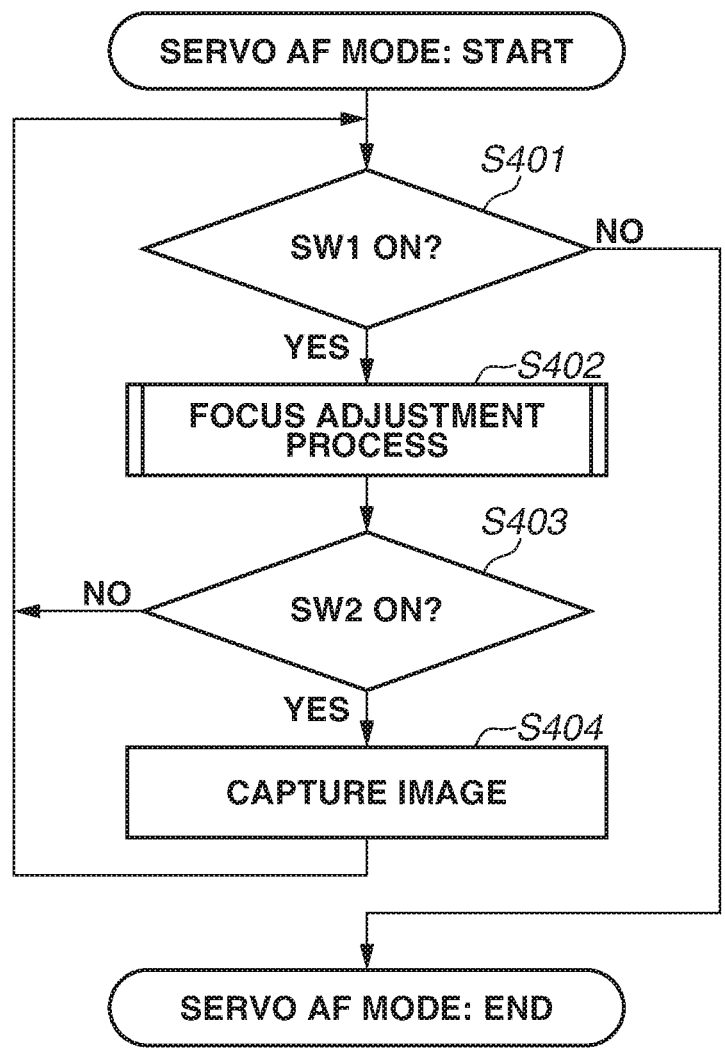
FIG. 2 is a flowchart illustrating an example of an operation of an image capturing process according to the first exemplary embodiment.

With reference to a flowchart in FIG. 2, an example of the operation of an image capturing process according to the first exemplary embodiment is described.

Generally, the camera has two types of modes, namely the mode of driving the lens relative to the image plane of the object (where lens must be focused) at a certain time (a one-shot image capturing mode) and the mode of driving the lens while predicting the image plane of the object at a time after the current time (a prediction image capturing mode). The first exemplary embodiment illustrates the operation of the camera when the camera is set in the prediction image capturing mode.

In step S401, the microcomputer 224 determines the state of the SW1. If the SW1 is on (Yes in step S401), the processing proceeds to step S402. If the SW1 is turned off (No in step S401), the microcomputer 224 performs control to end the prediction image capturing mode.

In step S402, the microcomputer 224 performs control to perform a focus adjustment process. The details of the focus adjustment process will be described below with reference to FIG. 3.

In step S403, the microcomputer 224 determines the state of the SW2. If the SW2 is off (No in step S403), the processing returns to step S401. If the SW2 is on (Yes in step S403), the processing proceeds to step S404.

In step S404, the microcomputer 224 performs control to flip up the main mirror 206 and cause the focal-plane shutter 211 to operate, thereby capturing an image. Then, the processing returns to step S401.

<Focus Adjustment Process>

Figure 3:
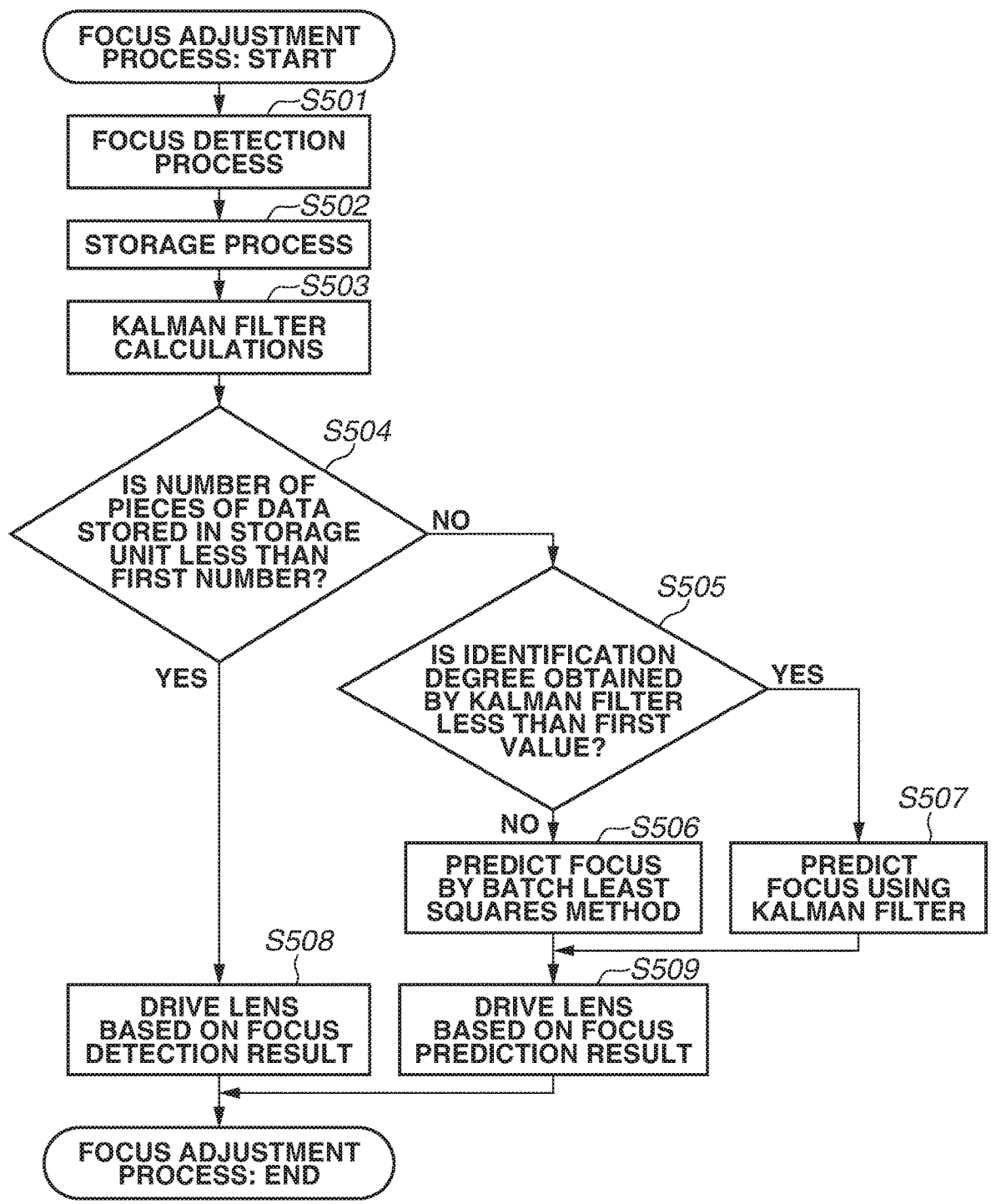
FIG. 3 is a flowchart illustrating a focus adjustment process according to the first exemplary embodiment.

With reference to a flowchart in FIG. 3, an example of the operation of the focus adjustment process in step S402 is described.

In step S501, the microcomputer 224 drives the focus detection circuit 210, thereby finding the amount of defocus. Further, based on the amount of defocus and the current position of the imaging lens 201, the microcomputer 224 acquires the image plane position, which is the position of the imaging lens 201 where the imaging lens 201 focuses on the object.

In step S502, the microcomputer 224 performs control to perform a storage process. In the storage process, the microcomputer 224 stores, in the memory 221, the image plane position obtained in step S501 and the detection time when the amount of defocus is obtained in step S501.

In step S503, the microcomputer 224 performs the above Kalman filter calculations. The Kalman filter is a type of recursive identification method, and unlike the batch least squares method, does not require a plurality of pieces of time series data when calculations are performed. The image plane position and the image plane moving speed at the time (k) are estimated as the information corresponding to the state of the object based on the state vector A(k).

In step S504, the microcomputer 224 evaluates whether the number of pieces of data stored in the memory 221 is less than a first number. If the number of pieces of data is less than the first number (Yes in step S504), the processing proceeds to step S508. If the number of pieces of data is equal to or greater than the first number (NO in step S504), the processing proceeds to step S505.

In step S505, the microcomputer 224 evaluates the identification degree of the Kalman filter calculations performed in step S503. The identification degree is evaluated using the above ex-post error covariance matrix P. This is because it is possible, using the ex-post error covariance matrix P, to determine whether the results of the state estimation vector A found by the Kalman filter calculations converge. If the identification degree, i.e., the ex-post error covariance matrix P, is less than a first value (Yes in step S505), the processing proceeds to step S507. This is because there is a possibility that the results of the state estimation vector A found by the Kalman filter calculations do not converge, i.e., an error has occurred in the image plane position obtained by the Kalman filter calculations. If the identification degree, i.e., the ex-post error covariance matrix P, is equal to or greater than the first value (No in step S505), the processing proceeds to step S506. The prediction techniques are thus switched based on the identification degree, whereby it is possible to select the technique for reducing the amount of calculation when the results of the Kalman filter calculations sufficiently converge.

In step S506, the microcomputer 224 predicts the focus by the batch least squares method. Specifically, a model formula or equation for the image plane position corresponding to the object is found by the batch least squares method, using a plurality of image plane positions stored in the memory 221 in step S502 and a plurality of pieces of time series data about the detection times when the image plane positions are detected. Then, the image plane position corresponding to the object at a time (k+1) after the current time (k) is found based on the obtained result of the model formula or equation.

In step S507, the microcomputer 224 predicts the focus using the Kalman filter. Since a model formula or equation for the image plane position corresponding to the object has been identified by finding the state vector A(k) in step S503, the image plane position in the future is predicted based on the result of the model formula or equation. More specifically, the image plane position at the time k+A d is calculated by using the image plane position (corresponding to the intercept) and the image plane moving speed (corresponding to the slope) at the time (k) estimated as the information corresponding to the state of the object by calculating the state vector A(k), and the model formula. The time k+Δd corresponds to a time when an image is captured. For example, the time k+Δd corresponds to the time in step S404.

In step S508, the microcomputer 224 performs control to drive the focus lens based on the focus detection result. The microcomputer 224 drives the imaging lens 201 based on the image plane position corresponding to the object obtained in step S501.

In step S509, the microcomputer 224 drives the lens based on the focus prediction result. Since the image plane position in the future has been found in step S506 or S507, the microcomputer 224 drives the focus lens based on the result of the found image plane position.

<Effects>

As described above, in the first exemplary embodiment, the driving of the focus lens is controlled based on the image plane position corresponding to the object calculated using the Kalman filter calculations. Consequently, the processing load can be made smaller and the focal position can be more appropriately adjusted to the object in a case where the Kalman filter calculations are used than in a case where the Kalman filter calculations are not used.

In the first exemplary embodiment, a case where the Kalman filter calculations are used and a case where the Kalman filter calculations are not used are switched according to conditions. As a result, the processing load can be reduced and also the focal position can be more appropriately adjusted to the object.

In the first exemplary embodiment, an example has been described where the Kalman filter calculations are used in a case where the identification degree obtained by the Kalman filter calculations is equal to or greater than a threshold.

In a second exemplary embodiment, an example is described where the motion of the object is taken into account in addition to the identification degree obtained by the Kalman filter calculations. In the second exemplary embodiment, features in common with the first exemplary embodiment are described as little as possible, and the second exemplary embodiment is described focusing on the differences from the first exemplary embodiment.

The configuration of a digital single-lens reflex camera (FIG. 1) and the operation of an image capturing process (FIG. 2) are similar to those in the first exemplary embodiment, and therefore are not described here.

<Focus Adjustment Process>

Figure 4:
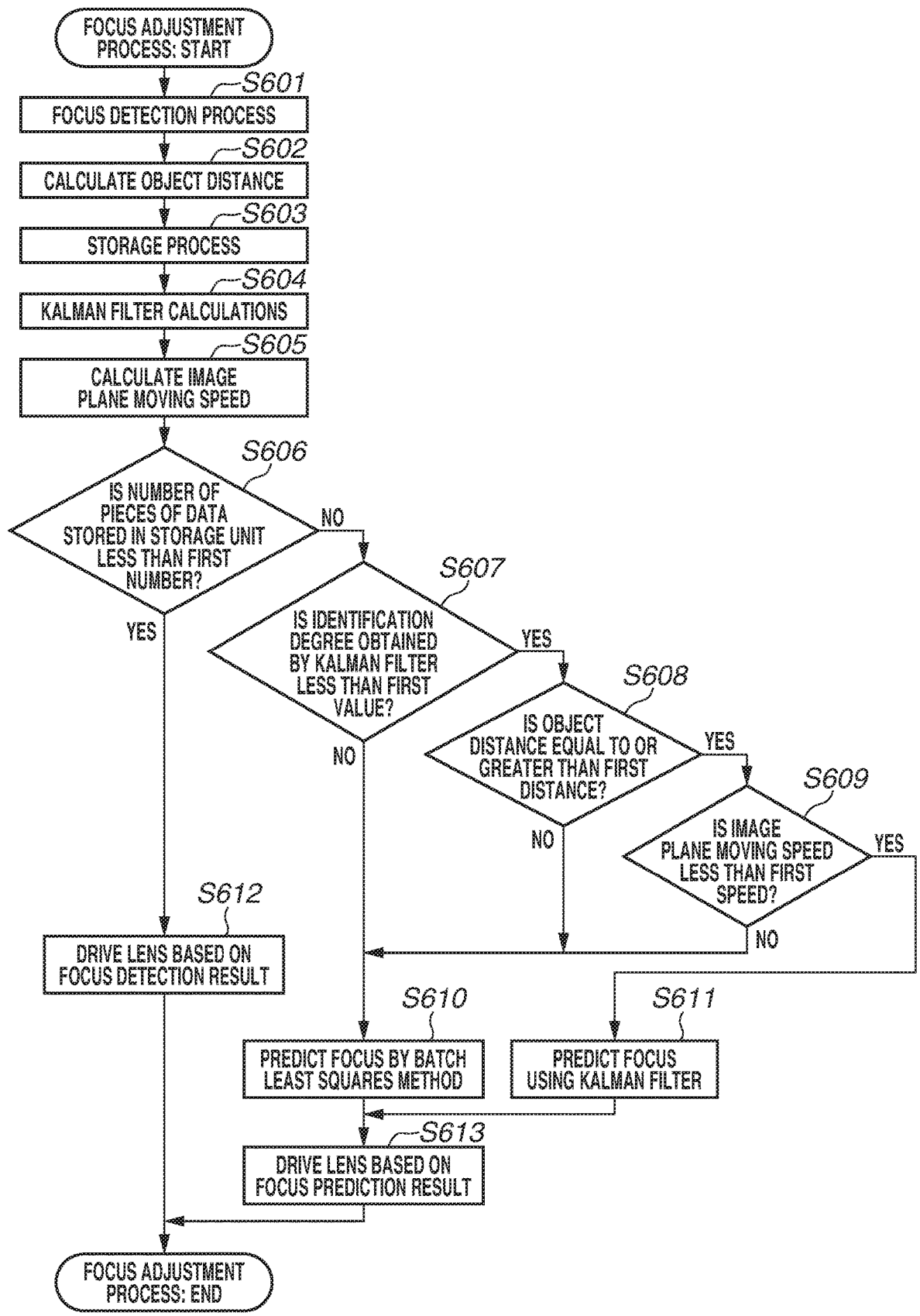
FIG. 4 is a flowchart illustrating a focus adjustment process according to a second exemplary embodiment.

With reference to a flowchart in FIG. 4, the operation of a focus adjustment process in the present exemplary embodiment is described.

Step S601 is similar to step S501, and therefore is not described here.

In step S602, the microcomputer 224 calculates an object distance. The object distance is an image capturing distance from the camera to the object. Using the lens communication circuit 203, the microcomputer 224 acquires, from the imaging lens 201, the object distance found from the current image formation position of the imaging lens 201.

Steps S603 and S604 are similar to steps S502 and S503, respectively, and therefore are not described here.

In step S605, the microcomputer 224 calculates the image plane moving speed. The image plane moving speed may be found by the Kalman filter calculations in step S604. In the present exemplary embodiment, the model formula or equation is two-dimensional (one-dimensional) at the time k. The column vector A is defined as representing the image plane position (intercept) at the time 0 and the average image plane moving speed (slope) at the time k. Thus, the image plane moving speed can be obtained by finding A(k). The image plane moving speed may be found by another known method.

Steps S606 and S607 are similar to steps S504 and S505, respectively, and therefore are not described here.

In step S608, the microcomputer 224 evaluates the object distance. If the object distance found in step S602 is equal to or greater than a first distance (Yes in step S608), the processing proceeds to step S609. If the object distance is less than the first distance (No in step S608), the processing proceeds to step S610. If the model formula or equation for use in the Kalman filter calculations is, for example, one-dimensional (two-dimensional) and when the object distance is small, it is conceivable that the image plane position corresponding to the object does not match the model formula. Thus, if the object distance is less than the first distance (No in step S608), the processing proceeds to step S610. In step S610, the image plane position in the future is found by the batch least squares method.

In step S609, the microcomputer 224 evaluates the image plane moving speed. If the image plane moving speed found in step S604 is less than a first speed (Yes in step S609), the processing proceeds to step S611. If the image plane moving speed is equal to or greater than the first speed (No in step S609), the processing proceeds to step S610. This is also because such a case is taken into account that the image plane position corresponding to the object does not match the model formula or equation when the image plane moving speed is fast, although it may depends on the model formula or equation for use in the Kalman filter calculations.

Steps S610 to S613 are similar to steps S506 to S509, respectively, and therefore are not described here.

<Effects>

As described above, in the second exemplary embodiment, the image plane position is found by employing the Kalman filter calculations according to the motion of the object. More specifically, whether to employ the Kalman filter calculations is determined according to the image plane moving speed corresponding to the moving speed of the object. In this way, the processing load can be reduced and also the image plane position corresponding to the object can be appropriately predicted.

In the first exemplary embodiment, an example has been described where the Kalman filter calculations are used in a case where the identification degree obtained by the Kalman filter calculations is equal to or greater than a threshold. In the second exemplary embodiment, an example has been described where the Kalman filter calculations are used further taking into account the motion of the object in addition to the example in the first exemplary embodiment.

In a third exemplary embodiment, an example is described where the Kalman filter calculations are used taking into account variation in focus detection results. In the third exemplary embodiment, features in common with the first exemplary embodiment are described as little as possible, and the third exemplary embodiment is described focusing on the differences from the first exemplary embodiment.

The configuration of a digital single-lens reflex camera (FIG. 1) and the operation of an image capturing process (FIG. 2) are similar to those in the first exemplary embodiment, and therefore are not described here.

<Focus Adjustment Process>

Figure 5:
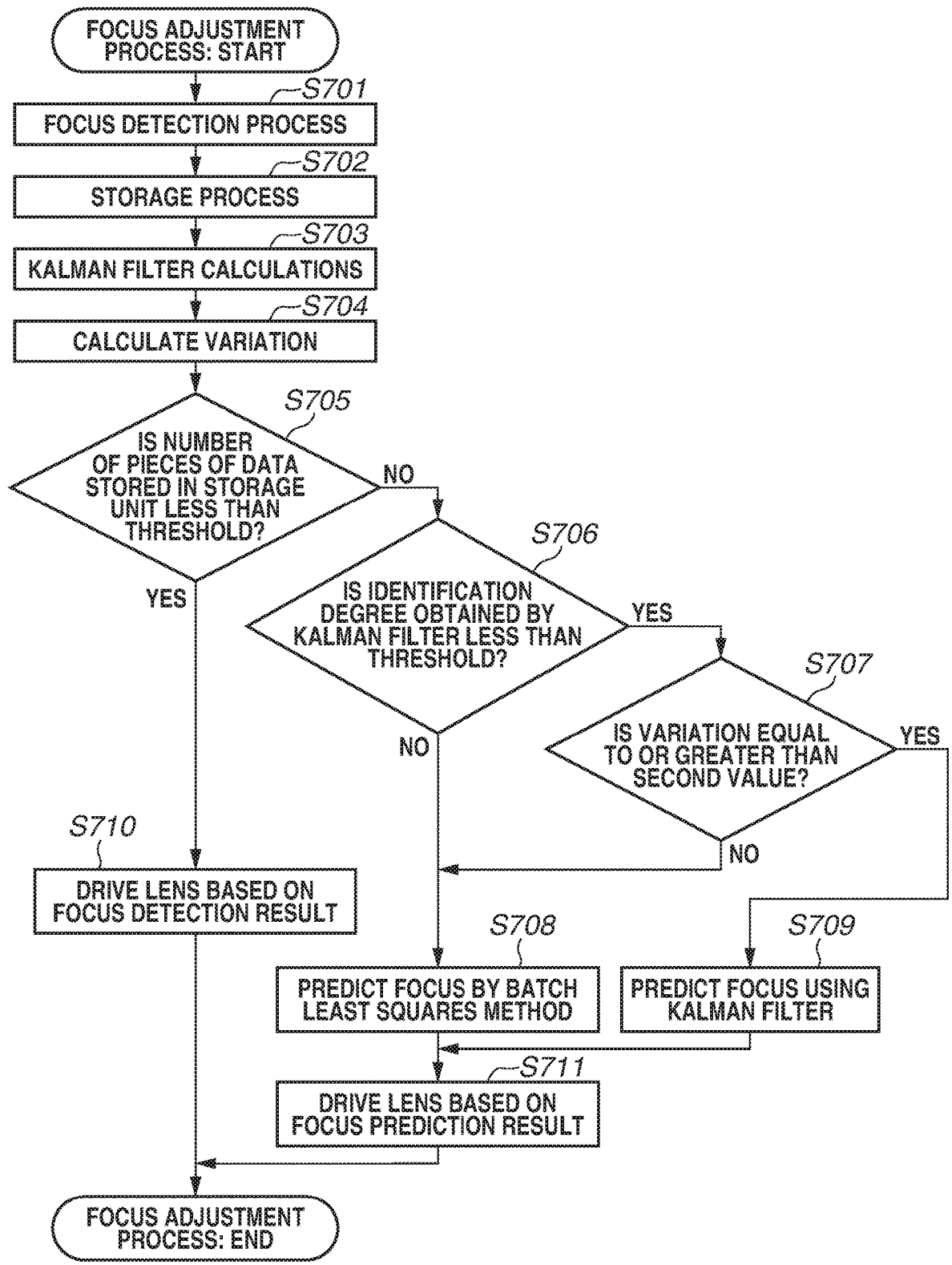
FIG. 5 is a flowchart illustrating a focus adjustment process according to a third exemplary embodiment.

With reference to a flowchart in FIG. 5, the operation of a focus adjustment process in the present exemplary embodiment is described.

Steps S701 to S703 are similar to steps S501 to S503, respectively, and therefore are not described here.

In step S704, the microcomputer 224 calculates variation. Generally, focus detection results vary to some extent. For example, the greater the object distance, the greater the variation in the focus detection results. In step S702, the microcomputer 224 finds variation in (the variance of) the image plane position corresponding to the object using image plane positions and the detection times when the image plane positions are detected, which are stored in the memory 221.

Steps S705 and S706 are similar to steps S504 and S505, respectively, and therefore are not described here.

In step S707, the microcomputer 224 evaluates the variation. If the variation in the image plane position found in step S704 is equal to or greater than a second value (Yes in step S707), the processing proceeds to step S709 to predict the focus using the Kalman filter calculations. This is because, since the Kalman filter calculations are calculations taking into account an error in detection results, the focus is predicted using the Kalman filter calculations, whereby it is possible to obtain a stable calculation result even in a situation where variation occurs in focus detection results. As a result of this, it is possible to calculate the image plane position with higher accuracy. If the variation in the image plane position found in step S704 is less than the second value (No in step S707), the processing proceeds to step S708.

Steps S708 to S711 are similar to steps S506 to S509, respectively, and therefore are not described here.

<Effects>

As described above, in the third exemplary embodiment, the Kalman filter calculations are used according to the variation in the focus detection results. More specifically, if the variation in the focus detection results is equal to or greater than a threshold, the Kalman filter calculations are used. Consequently, the amount of calculation, which becomes processing load, can be reduced and also the focal position can be more appropriately adjusted to the object.

In a case where the Kalman filter calculations are used, and if the matrix L and the column vector m are fixed, there is a case where the image plane position corresponding to the object deviates from the model formula or equation, depending on the motion of the object. Specifically, if the object comes close, whereby the image capturing distance becomes small and the image plane moving speed of the object becomes fast, the amount of change in the state estimation vector A needs to be made greater than in a case where the image capturing distance is not small and the image plane moving speed of the object is not fast. Otherwise, the image plane position corresponding to the object is likely to deviate from the model formula or equation. The amount of change in the state estimation vector A can be changed by the matrix L, the column vector m, and the variance $\sigma_v^2$. In response, in a fourth exemplary embodiment, an example is described where the Kalman filter calculations are performed with higher accuracy by changing setting parameters for use in the Kalman filter calculations according to various conditions.

A description is given of the fourth exemplary embodiment. In the fourth exemplary embodiment, features in common with the first exemplary embodiment are described as little as possible, and the fourth exemplary embodiment is described focusing on the differences from the first exemplary embodiment.

The configuration of a digital single-lens reflex camera (FIG. 1) and the operation of an image capturing process (FIG. 2) are similar to those in the first exemplary embodiment, and therefore are not described here.

<Focus Adjustment Process>

Figure 6:
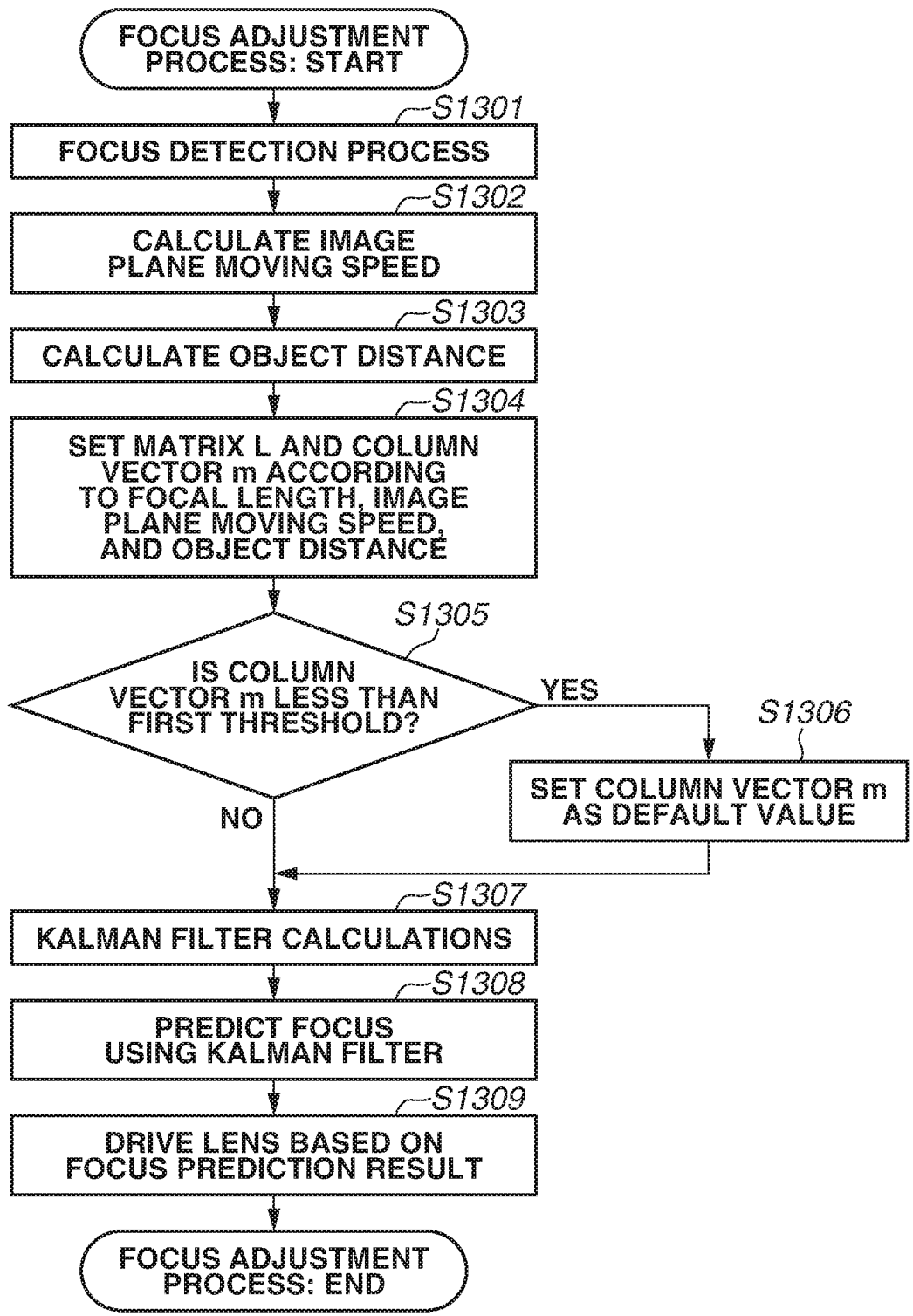
FIG. 6 is a flowchart illustrating a focus adjustment process according to a fourth exemplary embodiment.

With reference to a flowchart in FIG. 6, an example of the operation of a focus adjustment process in the fourth exemplary embodiment is described.

Step S1301 is similar to step S501, and therefore is not described here.

In step S1302, the microcomputer 224 calculates the image plane moving speed.

In step S1303, the microcomputer 224 calculates the object distance. Using the lens communication circuit 203, the microcomputer 224 acquires, from the imaging lens 201, the object distance found from the current image formation position of the imaging lens 201.

In step S1304, the microcomputer 224 sets the matrix L and the column vector m, according to the focal length, the image plane moving speed found in step S1302, and the object distance found in step S1303. The matrix L and the column vector m are thus changed based on the image plane moving speed and the object distance, whereby it is possible to find the image plane position in the future without the object distance of the object deviating from the model formula or equation.

In step S1305, the microcomputer 224 evaluates the column vector m found in step S1304. The microcomputer 224 evaluates whether the column vector m is less than a first threshold. If the column vector m is less than the first threshold (Yes in step S1305), the processing proceeds to step S1306. If not (No in step S1305), the processing proceeds to step S1307.

In step S1306, the microcomputer 224 sets the column vector m as a default value. If the amount of change indicated by the column vector m is small, the microcomputer 224 sets the column vector m as the default value and defines the minimum value of the amount of change.

In step S1307, the microcomputer 224 performs the Kalman filter calculations. Step S1307 is similar to step S503, and therefore is not described here.

In step S1308, the microcomputer 224 predicts the focus using the Kalman filter. Step S1308 is similar to step S507, and therefore is not described here.

In step S1309, the microcomputer 224 controls the driving of the focus lens based on the focus prediction result. Since the image plane position in the future has been found in step S1308, the microcomputer 224 controls the driving of the focus lens based on the result of the found image plane position.

<Effects>

Based on the above exemplary embodiment, the matrix L and the column vector m are changed according to various conditions, whereby it is possible to find the image plane position in the future using the Kalman filter even under the condition that the image plane position corresponding to the object can deviate from the model formula or equation.

Other Exemplary Embodiments

In the above exemplary embodiment, the Kalman filter calculations are used. Alternatively, a recursive least squares method (an RLS method), which is another type of recursive identification method, may be used. In this case, $\sigma^2_\omega(k)=1$. In other words, the recursive least squares method is a special example where fewer parameters than those in the Kalman filter calculations in the present exemplary embodiment are set. For this reason, effects similar to those of the Kalman filter are obtained in terms of the amount of calculation.

As the model formula or equation, as described above, a model formula or equation other than that introduced in the present exemplary embodiment can be used. In the above exemplary embodiment, an example of calculating the image plane position and the image plane moving speed at the time k as the information corresponding to the state of the object based on the state vector A(k) is described, but the information corresponding to the state of the object is not limited to this example. For example, the image plane position and the image plane moving speed at the time k can be calculated based on the state vector A(k).

Although in the fourth exemplary embodiment, the matrix L and the column vector m are set according to various conditions, at least one of the matrix L, the column vector m, and the variance $\sigma_v^2$ may only need to be set.

The matrix L, the column vector m, and the variance $\sigma_v^2$ may be set by a user. Consequently, it is possible to adjust the calculation result according to the characteristics of an image capturing scene recognized by the user.

The embodiments can also be achieved by the process of supplying a program for achieving one or more functions of the above exemplary embodiments to a system or an apparatus via a network or a storage medium, and of causing one or more processors of a computer of the system or the apparatus to read and execute the program. Further, the embodiments can also be achieved by a circuit (e.g., an application-specific integrated circuit (ASIC)) for achieving the one or more functions.

While desirable exemplary embodiments of the disclosure have been described above, the disclosure is not limited to these exemplary embodiments, but can be modified and changed in various manners within the scope of the disclosure.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-221285, filed Nov. 16, 2017, and No. 2018-207518, filed Nov. 2, 2018, which are hereby incorporated by reference herein in their entirety.

What is claimed is:

1. A lens control apparatus comprising at least one processor configured to perform operations of following units:
   a defocus amount detection unit configured to detect a defocus amount being a difference between an image formation position of an imaging lens and an image plane position of the imaging lens where the imaging lens performs an image capturing operation;
   a calculation unit configured to calculate an image plane position corresponding to an object from the defocus amount detected by the defocus amount detection unit and the image formation position of the imaging lens;
   a storage unit configured to store a plurality of detection times when the defocus amount detection unit detects the defocus amount and a plurality of previous image plane positions of the object calculated by the calculation unit;
   an identification unit configured to, using a model of a previous image plane position corresponding to the object and the image plane position corresponding to the object calculated by the calculation unit, identify a model of the image plane position corresponding to the object by a recursive identification method;
   a first prediction unit configured to, using the model of the image plane position corresponding to the object identified by the identification unit, predict the future image plane position corresponding to the object; and
   a determination unit configured to, in a case where an identification degree of the model of the image plane position corresponding to the object identified by the identification unit is less than a first threshold, determine that the future image plane position corresponding to the object predicted by the first prediction unit is to be used.

2. The lens control apparatus according to claim 1, wherein the at least one processor is configured to further perform an operation of a second prediction unit configured to predict the future image plane position corresponding to the object using the plurality of detection times and the plurality of image plane positions of the object corresponding to a plurality of defocus amounts and stored in the storage unit,
   wherein in a case where the identification degree of the model of the image plane position corresponding to the object identified by the identification unit is equal to or greater than the first threshold, the determination unit determines that the future image plane position corresponding to the object predicted by the second prediction unit is to be used.

3. The lens control apparatus according to claim 1, wherein the at least one processor is configured to further perform an operation of a distance calculation unit configured to calculate an image capturing distance of the object based on the image formation position of the imaging lens,
   wherein in a case where the identification degree of the model of the image plane position corresponding to the object identified by the identification unit is less than the first threshold, and the image capturing distance of the object calculated by the distance calculation unit is equal to or greater than a first distance, the determination unit determines that the future image plane position corresponding to the object predicted by the first prediction unit is to be used.

4. The lens control apparatus according to claim 3, wherein in a case where the image capturing distance of the object calculated by the distance calculation unit is less than the first distance, the determination unit determines that the future image plane position corresponding to the object predicted by the second prediction unit is to be used.

5. The lens control apparatus according to claim 2, wherein the at least one processor is configured to further perform an operation of a speed calculation unit configured to, based on the image plane position corresponding to the object calculated by the calculation unit, calculate an image plane moving speed, which is a moving speed of the image plane position, wherein in a case where the identification degree of the model of the image plane position corresponding to the object identified by the identification unit is less than the first threshold, and the image plane moving speed calculated by the speed calculation unit is less than a first speed, the determination unit determines that the future image plane position corresponding to the object predicted by the first prediction unit is to be used.

6. The lens control apparatus according to claim 5, wherein in a case where the image plane moving speed calculated by the speed calculation unit is equal to or greater than the first speed, the determination unit determines that the future image plane position corresponding to the object predicted by the second prediction unit is to be used.

7. The lens control apparatus according to claim 1, wherein the at least one processor is configured to further perform an operation of a variation calculation unit configured to, based on the plurality of image plane positions of the object stored in the storage unit, calculate variation in the image plane position corresponding to the object, wherein in a case where the identification degree of the model of the image plane position corresponding to the object identified by the identification unit is less than the first threshold, and the variation in the image plane position corresponding to the object calculated by the variation calculation unit is equal to or greater than first variation, the determination unit determines that the future image plane position corresponding to the object predicted by the first prediction unit is to be used.

8. The lens control apparatus according to claim 7, wherein in a case where the variation in the image plane position corresponding to the object calculated by the variation calculation unit is less than the first variation, the determination unit determines that the future image plane position corresponding to the object predicted by the second prediction unit is to be used.

9. The lens control apparatus according to claim 1, wherein the identification unit uses a Kalman filter as the recursive identification method.

10. The lens control apparatus according to claim 1, wherein the at least one processor is configured to further perform an operation of a change unit configured to change a parameter for the identification unit according to an observed motion of the object.

11. A control method for controlling a lens control apparatus, the control method comprising:

detecting a defocus amount being a difference between an image formation position of an imaging lens and an image plane position of the imaging lens where the imaging lens performs an image capturing operation;

calculating an image plane position corresponding to an object from a detected defocus amount and the image formation position of the imaging lens;

storing a plurality of detection times when the defocus amount is detected and a plurality of calculated previous image plane positions of the object;

identifying a model of the image plane position corresponding to the object by a recursive identification method, using a model of a previous image plane position corresponding to the object and the calculated image plane position corresponding to the object;

predicting the future image plane position corresponding to the object, using the identified model of the image plane position corresponding to the object; and determining that the predicted future image plane position corresponding to the object is to be used in a case where an identification degree of the identified model of the image plane position corresponding to the object is less than a first threshold.

* * * * *